US010564331B2

(12) United States Patent
Orensteen et al.

(10) Patent No.: US 10,564,331 B2
(45) Date of Patent: Feb. 18, 2020

(54) CUBE CORNER SHEETING HAVING OPTICALLY VARIABLE MARKING

(71) Applicant: 3M INNOVATIVE PROPERTIES COMPANY, St. Paul, MN (US)

(72) Inventors: Bruce D. Orensteen, Saint Paul, MN (US); Kathryn M. Spurgeon, River Falls, WI (US); Olester Benson, Jr., Woodbury, MN (US); Joseph V. Crimando, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/272,155

(22) Filed: Sep. 21, 2016

(65) Prior Publication Data

US 2017/0010394 A1    Jan. 12, 2017

Related U.S. Application Data

(62) Division of application No. 14/114,938, filed as application No. PCT/US2012/039022 on May 23, 2012, now Pat. No. 9,463,601.

(60) Provisional application No. 61/491,602, filed on May 31, 2011.

(51) Int. Cl.
*G02B 5/124* (2006.01)
*B29D 11/00* (2006.01)
*E01F 9/60* (2016.01)
*B60Q 1/56* (2006.01)
*G02B 5/04* (2006.01)
*G09F 13/16* (2006.01)

(52) U.S. Cl.
CPC ........ *G02B 5/124* (2013.01); *B29D 11/00605* (2013.01); *B29D 11/00788* (2013.01); *B60Q 1/56* (2013.01); *E01F 9/60* (2016.02); *G02B 5/045* (2013.01); *G09F 13/16* (2013.01)

(58) Field of Classification Search
CPC . G02B 5/124; G02B 5/045; E01F 9/60; G09F 13/16; B29D 11/00605; B29D 11/00788
See application file for complete search history.

(56) References Cited

U.S. PATENT DOCUMENTS

| | | |
|---|---|---|
| 3,745,586 A | 7/1973 | Braudy |
| 4,634,220 A | 1/1987 | Hockert |
| 4,775,219 A | 10/1988 | Appeldorn |
| 4,877,717 A | 10/1989 | Suzuki |
| 5,656,360 A | 8/1997 | Faykish |
| 5,691,846 A | 11/1997 | Benson, Jr. |
| 5,770,124 A | 6/1998 | Marecki |
| 5,780,140 A | 7/1998 | Nilsen |
| 5,940,212 A | 8/1999 | Johnson |
| 5,948,588 A | 9/1999 | Sawyer |

(Continued)

FOREIGN PATENT DOCUMENTS

| | | |
|---|---|---|
| WO | WO 2011-060086 | 5/2011 |
| WO | WO 2012-166448 | 12/2012 |
| WO | WO 2012-166460 | 12/2012 |

OTHER PUBLICATIONS

International Search Report for PCT International Application No. PCT/US2012/039022 dated Dec. 21, 2012, 4 pages.

*Primary Examiner* — Mathieu D Vargot
(74) *Attorney, Agent, or Firm* — 3M IPC; Carlos M. Téllez

(57) ABSTRACT

Retroreflective sheeting having a structured layer of cube corner elements and an at least one optically variable mark therein, and methods of making same.

13 Claims, 6 Drawing Sheets

(56) References Cited

U.S. PATENT DOCUMENTS

| | | |
|---|---|---|
| 6,120,636 A | 9/2000 | Nilsen |
| 7,517,205 B2 | 4/2009 | Mullen |
| 2002/0051866 A1 | 5/2002 | Mullen |
| 2005/0141243 A1 | 6/2005 | Mullen |
| 2007/0099478 A1 | 5/2007 | Petersen |
| 2008/0012162 A1 | 1/2008 | Chapman |
| 2008/0212181 A1 | 9/2008 | Wu |

CUBE CORNER SHEETING HAVING OPTICALLY VARIABLE MARKING

CROSS REFERENCE TO RELATED APPLICATIONS

This application is a divisional of U.S. application Ser. No. 14/114,938, filed on Oct. 31, 2013, now U.S. Pat. No. 9,463,601, which is a National Stage Filing under 35 U.S.C. 371 of PCT/US2012/039022, filed May 23, 2012, which claims priority to U.S. Provisional Patent Application No. 61/491,602, filed May 31, 2011, the disclosures of which are incorporated by reference in their entirety herein.

BACKGROUND

Retroreflective materials have the ability to redirect light incident on the material back toward the originating light source. This property has led to the widespread use of retroreflective sheeting for a variety of traffic and personal safety uses. For example, retroreflective sheeting is commonly employed in a variety of articles, such as, road signs, barricades, license plates, pavement markers, and marking tape, as well as retroreflective tapes for vehicles and clothing.

Two known types of retroreflective sheeting are microsphere-based sheeting and cube corner sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes, vapor coats, etc.) to retroreflect incident light. Due to the symmetrical geometry of beaded retroreflectors, microsphere based sheeting exhibits the same light return regardless of orientation (i.e., when rotated about an axis normal to the surface of the sheeting). Therefore, it is said that the distribution of light returned by beaded retroreflective sheeting is generally rotationally symmetric. Thus when viewing or measuring the coefficient of retroreflection ("$R_A$", typically expressed in units of candelas per lux per square meter) at presentation angles from 0 to 360 degrees, or when measuring at orientation angles from 0 to 360, there is relatively little variation in the retroreflectivity of beaded sheeting. For this reason, such microsphere-based sheeting has a relatively low sensitivity to the orientation at which the sheeting is placed on a surface. In general, however, such sheeting has a lower retroreflective efficiency than cube corner sheeting.

Cube corner retroreflective sheeting, sometimes referred to as "prismatic" sheeting, typically comprises a thin transparent layer having a substantially planar first surface and a second structured surface comprising a plurality of geometric structures, some or all of which include three reflective faces configured as a cube corner element. Cube corner retroreflective sheeting is commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). The mold is then replicated using any suitable technique such as conventional nickel electroforming to produce tooling for forming cube corner retroreflective sheeting by processes such as embossing, extruding, or cast-and-curing. Known methods for manufacturing the master mold include pin-bundling techniques, direct machining techniques, and techniques that employ laminae. These microreplication processes produce a retroreflective sheeting with prismatic structures that have been precisely and faithfully replicated from a microstructured tool having a negative image of the desired prismatic structure.

Prismatic retroreflective sheeting, in contrast to beaded retroreflective sheeting, is generally rotationally non-symmetric. Thus, when viewing or measuring $R_A$ at presentation angles from 0 to 360 degrees, or when measuring at orientation angles from 0 to 360, there is significant variation in the retroreflectivity of prismatic sheeting. Therefore, prismatic sheeting has a higher sensitivity to the orientation at which the sheeting is placed on a surface than beaded sheeting.

SUMMARY

In view of the progress in the field of computer-based desktop publishing, scanning, and laser-marking, there is a need to minimize or prevent the unauthorized replication of security marks (e.g., security marks used in license plates). In at least some implementations, it may be desirable to have security marks in license plates or sheeting observable by the unaided eye when the viewer is head-on looking at the license plate or sheeting from a distance (e.g., in a range from about 0.1 meter to about 10 meters).

Consequently, the present disclosure describes security marking for use on retroreflective sheeting. The security marking makes use of the asymmetrical properties of prismatic retroreflective sheeting to create visible features.

In one aspect, the present disclosure describes retroreflective sheeting, comprising: a structured layer comprising cube corner elements; and at least one optically variable mark in the structured layer of cube corner elements; wherein the at least one optically variable mark comprises at least first and second mark elements, the first optically variable mark element having a first visual feature, and the second optically variable mark element having a second visual feature different from the first visual feature.

In a second aspect, the present disclosure describes retroreflective sheeting, comprising: a structured layer of cube corner elements; and at least one optically variable mark in the structured layer of cube corner elements; wherein the at least one optically variable mark comprises a mark element path having a continuously varied visual feature along its length.

In a third aspect, the present disclosure describes a method of forming retroreflective sheeting, the method comprising providing a mold having a structured surface including a plurality of cube corner cavities therein; at least partially filling the plurality of cube corner cavities with a radiation curable resin; exposing the radiation curable resin to a first, patterned irradiation to provide a first energy density level of irradiation to the radiation curable resin in a first area of the plurality of cube corner cavities, to form a first optically variable mark element; exposing the radiation curable resin to a second, patterned irradiation to provide a second energy density level of irradiation different from the first energy density level of irradiation to the radiation curable resin in a second area of the plurality of cube corner cavities, to form a second optically variable mark element; exposing the radiation curable resin to a third irradiation to provide a third energy density level of irradiation to at least the radiation curable resin in an area of the plurality of cube corner cavities contiguous with the first and second areas thereof, wherein the third energy density level is different from the first and second energy density levels, to provide retroreflective sheeting having a structured layer of cube corner elements and an optically variable mark therein comprising the first and second mark elements; and separating the retroreflective sheeting from the mold.

In a fourth aspect, the present disclosure describes a method of forming retroreflective sheeting, the method comprising providing a mold having a structured surface including a plurality of cube corner cavities therein; at least partially filling the plurality of cube corner cavities with a radiation curable resin; exposing a first portion of the radiation curable resin along a predetermined path to a first, continuously varied level of irradiation to provide an optically variable mark element; and exposing at least a second portion of the radiation curable resin in a plurality of cube corner cavities contiguous with the mark element path to a second irradiation, to provide retroreflective sheeting having a structured layer of cube corner elements and an optically variable mark element therein; and separating the retroreflective sheeting from the mold.

In this application, "at least partially filling" refers to coating at least some individual cavities in a plurality of cavities in the structured surface of a mold with a resin, such that the individual cavities in the plurality of cavities each have some amount of resin within them;

"Continuously varying" refers to a gradual increase or decrease in the value of a variable; (e.g., a "continuously varied" level of irradiation progresses gradually, within machine tolerances, through a range of energy density values);

"Continuously varying energy density" or "continuously varied energy density level" as used herein means that the energy emitted by an apparatus and/or absorbed by an area varies over at least one of time or space (i.e., distance). This time or space interval can be any interval that is greater than the inherent tolerance or error of the apparatus. In other words, a "continuously varied energy density" is one that is intentionally altered over at least one of time or space. In one exemplary instance, the energy emitted by the apparatus at a time 1 differs from the energy emitted by the apparatus at a time 2. In one embodiment, the time interval between time 1 and time 2 is about 1 millisecond. In another exemplary instance, the energy absorbed by the resin in an area 1 differs from the energy absorbed by the resin in an area 2. In some embodiments, the distance between area 1 and area 2 ranges from about 0.3 millimeter to about 1 millimeter. In both instances, the differential between the energy emitted or absorbed at point 1 and point 2 can be positive (i.e., increased) or negative (i.e., decreased). In some exemplary embodiments, the apparatus emitting the energy is programmed to change the energy density emitted by the apparatus at some time interval. In some instances, this difference is a gradual progression (i.e., one or more gradual changes). In some exemplary embodiments, the continuously varied energy density level has a highest energy density value and a lowest energy density value, and the difference between the highest energy density value and the lowest energy density value is at least 0.1 Joule/cm$^2$.

"Cube corner cavities" refers to cavities in the structured surface of a mold that typically have trihedral structures that have three approximately mutually perpendicular lateral faces meeting in a single corner;

"Different energy density" refers to a difference of at least 0.1 Joule/cm$^2$ between a first energy density level of irradiation and a second energy density level of irradiation.

"Land layer" refers to a layer disposed immediately adjacent to the base of the cube corner elements;

"Mark element" refers to a component of an optically variable mark of the present disclosure.

"Mark element path" refers to a predetermined region that includes a component of an optically variable mark of the present disclosure. A mark element path includes at least one mark element, and can include a plurality of discrete and/or continuous mark elements.

"Optically variable mark" refers to a retroreflective mark exhibiting a varying appearance depending on, for example, the angle at which the mark is viewed, or the type of light that is used to view the retroreflective mark (e.g., reflective light versus transmissive light, or visible versus non-visible light). An optically variable mark may be continuous (e.g., an unbroken line) or discontinuous (e.g., a broken line);

"Partially cured" refers to part of a radiation curable resin being cured to such a degree that it will not substantially flow;

"Pattern" refers to a spatially varying appearance and is at least one of a uniform or periodic pattern, a varying pattern, or a random pattern; in some embodiments, the pattern is a non-random pattern.

"Patterned irradiation" refers to at least one of irradiating through transparent regions of a mask, guiding a beam of light, guiding a beam of electrons, or projecting a digital image, to generate a pattern of curing in a radiation curable resin;

"Security mark" refers to an element on or in a retroreflective film that is surrounded by a background visual appearance. In many embodiments, the security mark is an "island" feature surrounded by a continuous background appearance. The security mark can change appearance to a viewer as the viewer changes their point of view of the security mark. A security mark may be continuous (e.g., an unbroken line) or discontinuous (e.g., a broken line).

"Visible" refers to being apparent and identifiable (i.e., to ascertain definitive characteristics of) to the unaided human eye of normal (i.e., 20/20) vision, using light from within a wavelength range of 400 nm to 700 nm. By "unaided", it is meant without the use of a microscope or magnifying glass.

The disclosed sheeting may be useful in a variety of applications such as securing tamperproof images in security documents, passports, identification cards, financial transaction cards (e.g., credit cards), license plates, or other signage.

BRIEF DESCRIPTION OF THE DRAWINGS

The disclosure may be more completely understood in consideration of the following detailed description of various embodiments of the disclosure in connection with the accompanying drawings, in which.

Figure 1:
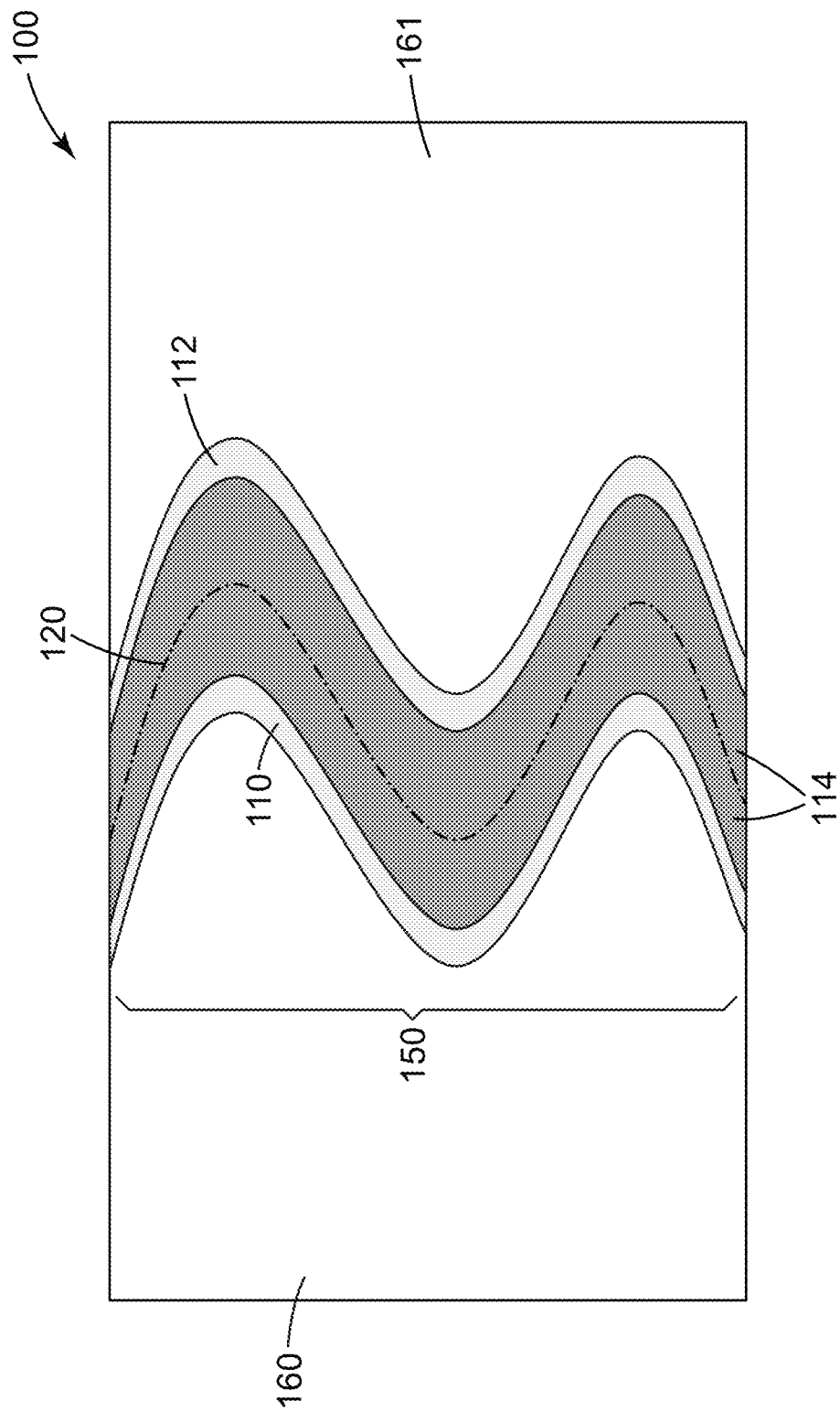
FIGS. 1 to 4 are illustrations of exemplary embodiments of retroreflective sheeting of the present description.

Like reference numbers in the various figures indicate like elements. However, it will be understood that the use of a number to refer to a component in a given figure is not intended to limit the component in another figure labeled with the same number. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the description. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", "up" and "down", and "first" and "second" may be used in this disclosure, it should be understood that those terms are used in their relative sense only unless otherwise noted. In particular, in some embodiments certain components may be present in interchangeable and/or identical multiples (e.g., pairs). For these components, the designation of "first" and "second" may apply to the order of use, as noted herein (with it being irrelevant as to which one of the components is selected to be used first).

DETAILED DESCRIPTION

The optically variable marks can be formed in a cube corner retroreflective (prismatic) structure. The marks change appearance with observation angle. Observation angle is the angle subtended by the viewing axis and the source axis, which intersect at the surface of the prismatic material. At small observation angles, the marks may appear dark relative to a bright non-marked field, or vice-versa. In some embodiments, as observation angle increases, the marks become similar in appearance to the non-marked field, and then become brighter than the non-marked field. Alternatively, the marks become similar in appearance to the non-marked field, and then become darker than the non-marked field. Finally at large observation angles, in some embodiments, for example more than ten degrees, the marks are no longer visible. The variable effects of the marks are easily seen by an observer, by holding a light source close to the eyes, and then moving it to the side, thus increasing the observation angle.

The marks also show optically variable effects which change with entrance angle. Entrance angle is the angle subtended by the source axis and an axis normal to the prismatic surface. In some embodiments, when viewing a marked prismatic panel at a fixed, small observation angle, while changing the entrance angle by tilting the panel, the marked area appears dark until nearly 90 degrees entrance, then changes to bright against a dark non-marked field.

By changing the conditions used to form the marks, it is possible to control the angles at which the marks change from dark to bright to non visible. In some embodiments, the marks change from bright to non-visible. Thus, marks with a variety of visual effects can be formed.

Further, it is possible to form several marks in the same region of a prismatic material, each mark having different optically variable effects seen at a different range of angles. Thus, when the marks are viewed together across a range of observation angles, they vary in different ways. In one exemplary embodiment, a series of marks is formed at specific conditions, resulting in the appearance of motion as observation angle is changed.

FIG. 1 illustrates an exemplary embodiment of retroreflective sheeting 100, having optically variable mark 150 and background areas 160 and 161. Optically variable mark 150 includes optically variable mark elements 110, 112, 114, and 120. Each of the labeled areas (i.e., 110, 112, 114, 120, 160, and 161) includes cube corner elements, and each of the labeled areas has at least one visual feature associated with the cube corner elements. Optically variable mark element 110 has a visual feature (e.g., retroreflectance at a given observation angle) different from the corresponding visual feature (i.e., retroreflectance at a given observation angle) associated with optically variable mark element 114. Optically variable mark elements 110 and 112 may be visually distinguishable from each other. Background areas 160 and 161 have visual features (e.g., retroreflectance at a given observation angle) that are visually indistinguishable from each other, though from different observation angles, they may be visually distinguishable from each other.

Optically variable mark element 120 is shown in FIG. 1 as a broken line running through optically variable mark element 114, consisting of alternating dots and dashes, wherein the visual feature (e.g., retroreflectance at a given observation angle) is constant along the length of optically variable mark element 120.

Figure 2:
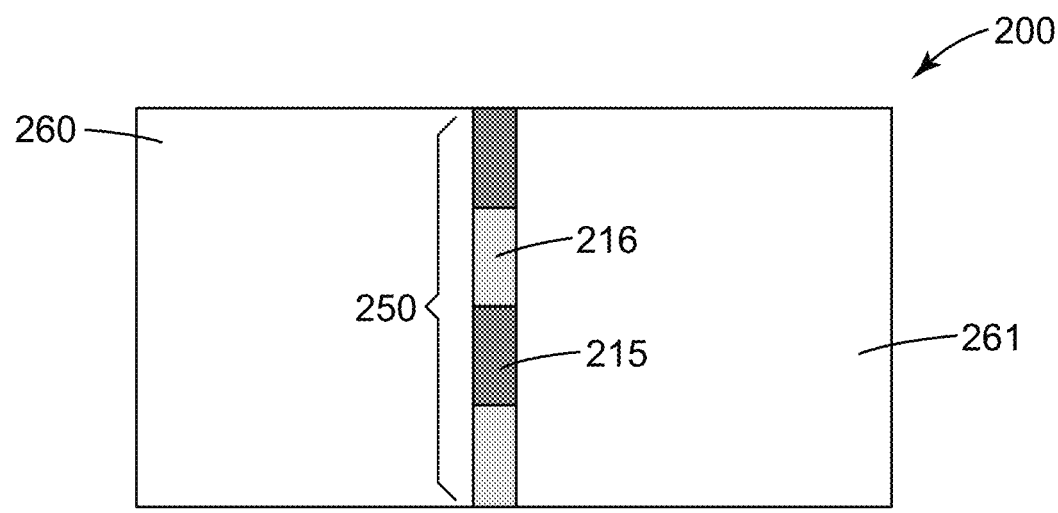

FIG. 2 illustrates an exemplary embodiment of retroreflective sheeting 200, having optically variable mark 250 and background areas 260 and 261. Optically variable mark 250 has contiguous optically variable mark elements 215 and 216. In the embodiment shown, each of the labeled areas (i.e., 215, 216, 260, and 261) includes cube corner elements, and each of the labeled areas has at least one visual feature associated with the cube corner elements. Optically variable mark element 215 has a visual feature (e.g., retroreflectance at a given observation angle) different from the corresponding visual feature (i.e., retroreflectance at a given observation angle) associated with optically variable mark element 216. Background areas 260 and 261 have visual features (e.g., retroreflectance at a given observation angle) that are visually indistinguishable from each other, though from different observation angles, they may be visually distinguishable from each other.

Figure 3:
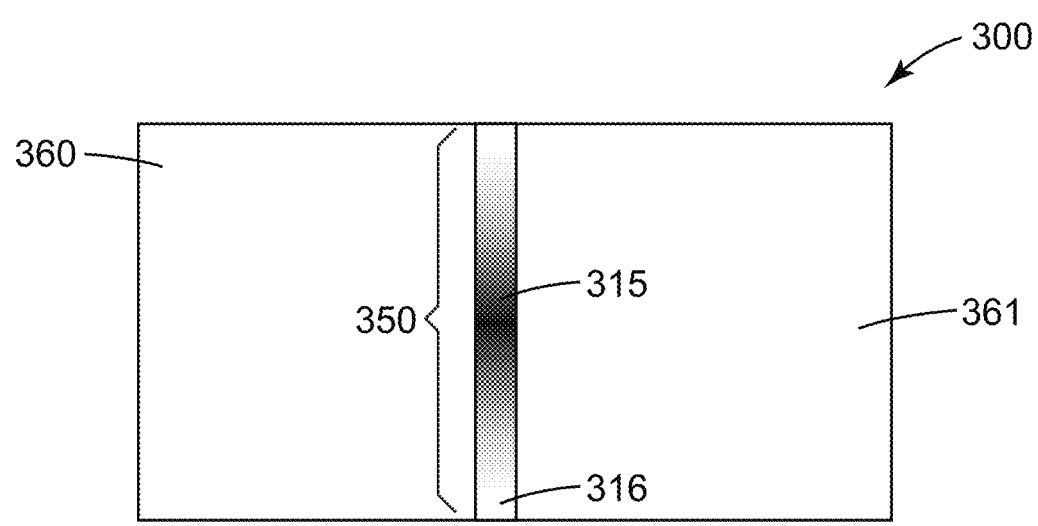

FIG. 3 illustrates an exemplary embodiment of retroreflective sheeting 300, having optically variable mark 350 and background areas 360 and 361. Each of optically variable mark 350 and background areas 360 and 361 includes cube corner elements, and each of the labeled areas has at least one visual feature associated with the cube corner elements. Optically variable mark 350 is a single optically variable mark element having a continuously varied visual feature along its length (i.e., from the point identified by label 315 to the point identified by label 316).

Figure 4:
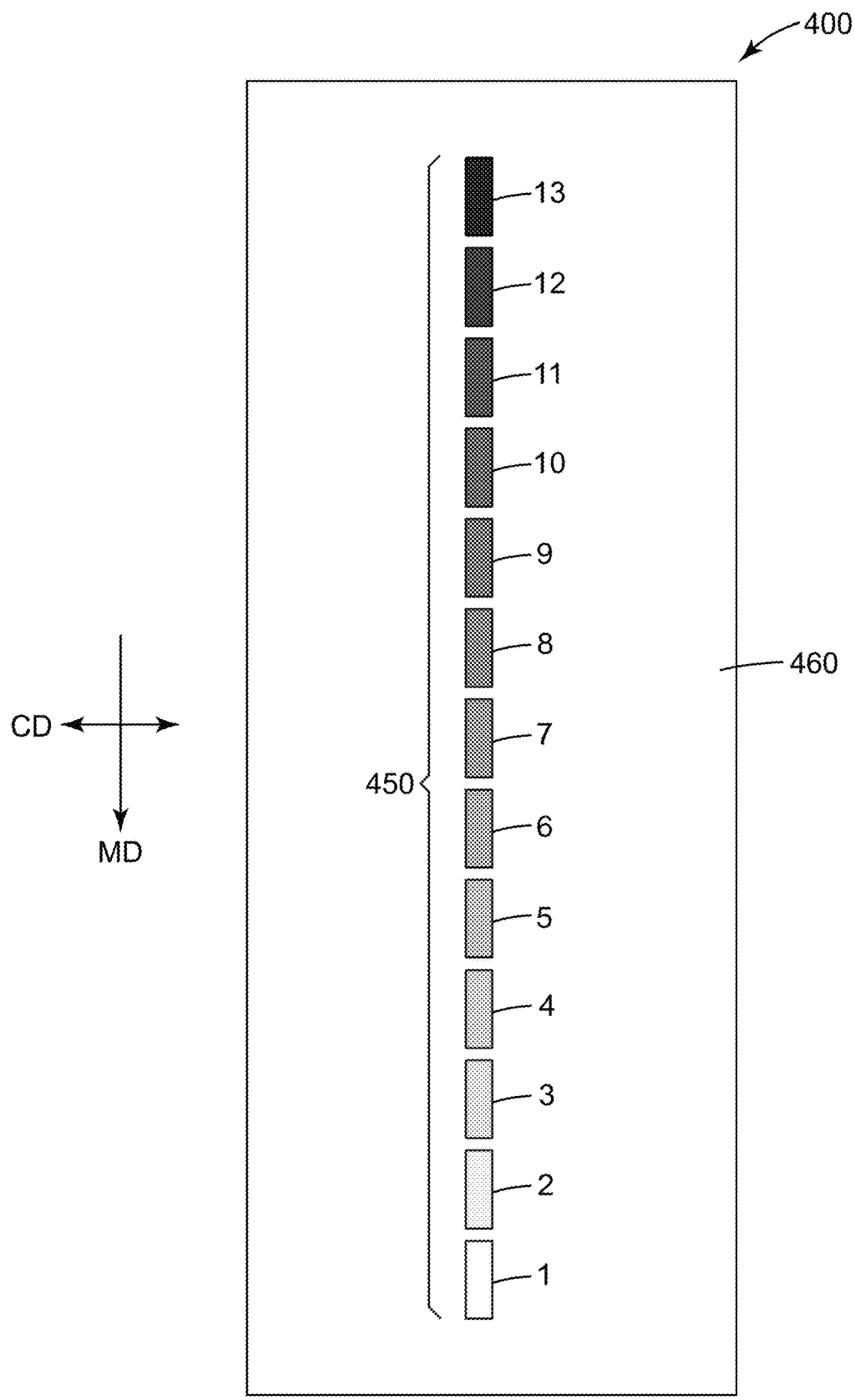

FIG. 4 illustrates an exemplary embodiment of retroreflective sheeting 400, having optically variable mark 450 and background area 460. Optically variable mark 450 has a linear sequence of optically variable mark elements 1 to 13, each optically variable mark element having an associated visual feature (generally indicated by gray scale shading) that is visually distinguishable from the corresponding visual feature associated with adjacent optically variable mark element(s).

Referring again to FIG. 4, the arrangement of optically variable mark elements in optically variable mark 450 in a linear sequence provides an "appearance of motion" effect under some conditions. For example, in embodiments where the associated visual feature is retroreflectance at a given observation angle, and where the optically variable mark elements are arranged in a sequence such that each successive optically variable mark element requires an increase in observation angle to achieve maximal retroreflectance, a viewer can direct a light source (e.g., a flashlight) at the reflective sheeting and sweep the light source through a range of observation angles selected to include maximal retroflectance for each of the optically variable mark elements, and the viewer will observe an apparent motion of maximal retroreflectance along the optically variable mark (i.e., maximal retroreflectance will appear to progress from one optically variable mark element to the next). A typical range of observation angles for observing maximal retroreflectance includes 0.5 degree to 15 degrees. The range of observation angles is readily achieved by a viewer positioned about 10 feet away from the retroreflective sheeting and extending an arm to one side (while holding the light source in the hand of the extended arm), although other distances may also be used.

Figure 5:
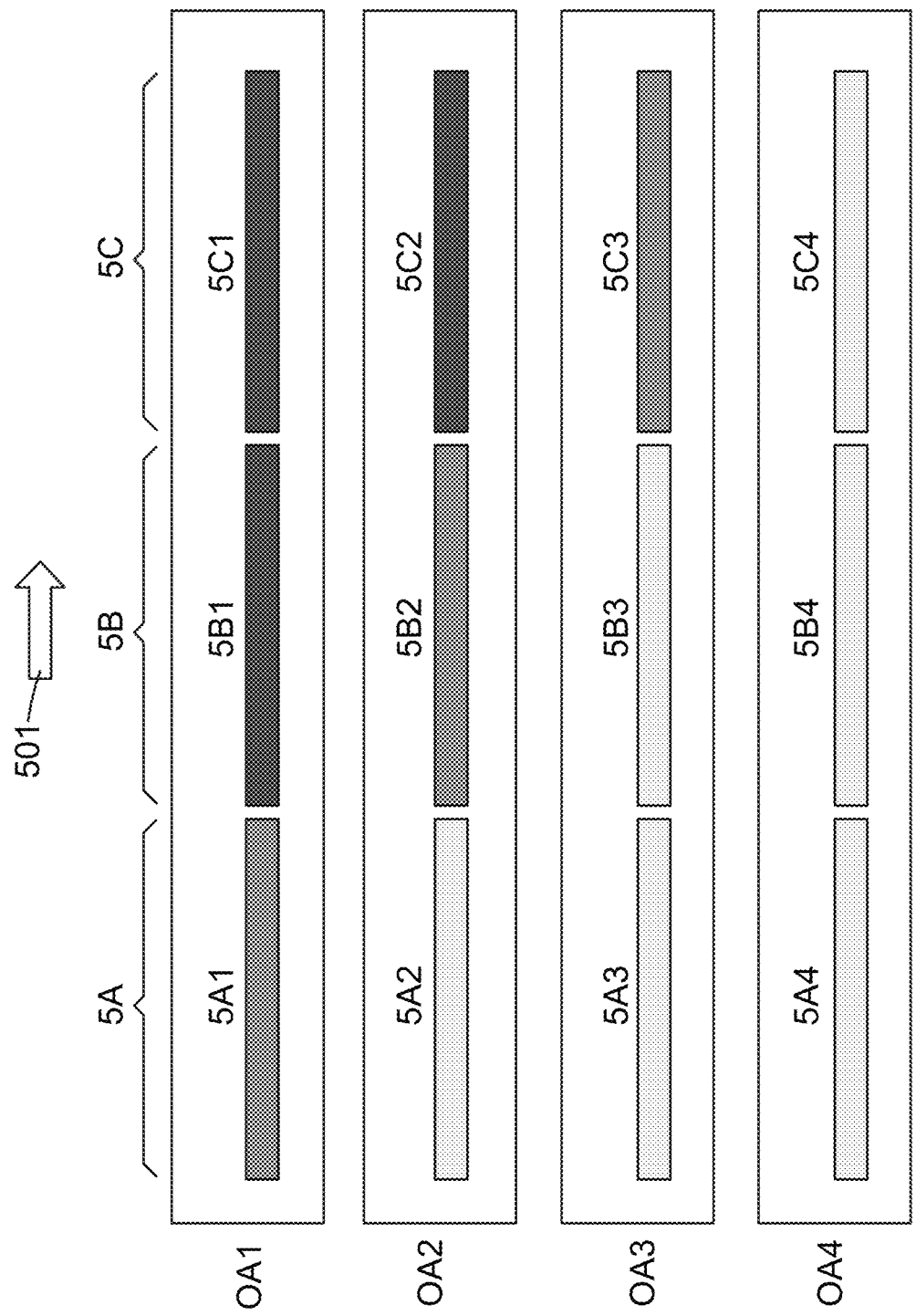
FIG. 5 is an illustration of an exemplary embodiment of retroreflective sheeting of the present description, as viewed under different observation angle conditions.

FIG. 5 provides an exemplary illustration of an "appearance of motion" effect, using a linear sequence of 3 optically variable mark elements ("segments") 5A, 5B, and 5C. An appearance of motion can be achieved, for example, when the observation angle required for achieving a peak retroreflectance level in any given segment increases sequentially from segments 5A to 5C, in the direction indicated by arrow 501. In the arrangement of segments, a process of sweeping a light source through a range of increasing observation angles OA1 to OA4 (OA1<OA2<OA3<OA4) results in a sequence of peak retroreflectance levels appearing to move from one segment to the next, in the direction of arrow 501. At observations angles OA1, the visual to observed retroreflectance 5A1 is brighter than observed retroreflectance 5B1 and 5C1. Progressing from OA1 to OA2, the observed retroreflectance gradually becomes brighter for segments 5B and 5C, until all three segments appear to be bright, and it will appear to an observer that the brightness has moved into segments 5B and 5C. The selection of visual features can be adjusted so that a peak brightness appears to migrate from one segment to the next (e.g., in FIG. 4 a peak brightness may move sequentially from segment to segment), or to extend across a range of segments (e.g., in FIG. 4 a peak brightness may gradually extend across the full range of segments 1 to 13).

An optically variable mark of the present description includes at least one visual feature. In some embodiments, optically variable marks include visual features independently selected from the group consisting of retroreflectance at a given orientation, entrance or observation angle, brightness at a given orientation, entrance or observation angle, whiteness at a given orientation, entrance or observation angle, and rotational symmetry. These visual features can be created by having a first portion that includes a first light divergence profile and the second portion includes a second light divergence profile, and the first light divergence profile is visually different than the second light divergence profile. The term "divergence profile" is described in U.S. Pat. No. 4,775,219 (Appledorn), the description of which is incorporated herein by reference. In some embodiments, these visual features are created by a first portion that includes a first set of cube corner elements having a first cube size and the second portion that includes a second set of cube corner elements having a second cube size that differs from the first cube size. In some embodiments, these visual features are created by a first portion that includes a first set of cube corner elements having a first degree of cant and a second portion that includes a second set of cube corner elements having a second degree of cant that differs from the first degree of cant. In other embodiments, for example, these visual features are created by having a first portion that includes a first set of cube corner elements and the second portion includes a second set of cube corner elements, where the first and second sets of cube corner elements are truncated cube corner elements and full cube corner elements, respectively.

Other embodiments of visual features arranged in a sequence or other configuration can be provided by appropriate selection of patterned irradiation during the microreplication process.

The optically variable marks are formed using a radiation curable material during a "continuous cast and cure" microreplication process. A radiation curable resin is coated onto a cube corner mold so as to at least partially fill the cube corner cavities. A directed light source (e.g., an ultraviolet laser beam) is then used to irradiate the resin/mold in an imagewise fashion. The areas of resin receiving laser radiation are partly cured. Additional radiation curable resin is coated onto a carrier web, which is then applied, coated side to the mold, using a nip roll. Additional curing radiation then irradiates the resin through the carrier web. The carrier web with cured cube corners attached is then removed from the mold, becoming a finished cube film. Optionally additional curing radiation can then be applied to the cube film. Optionally the cube film can also be passed through an oven.

Figure 7:
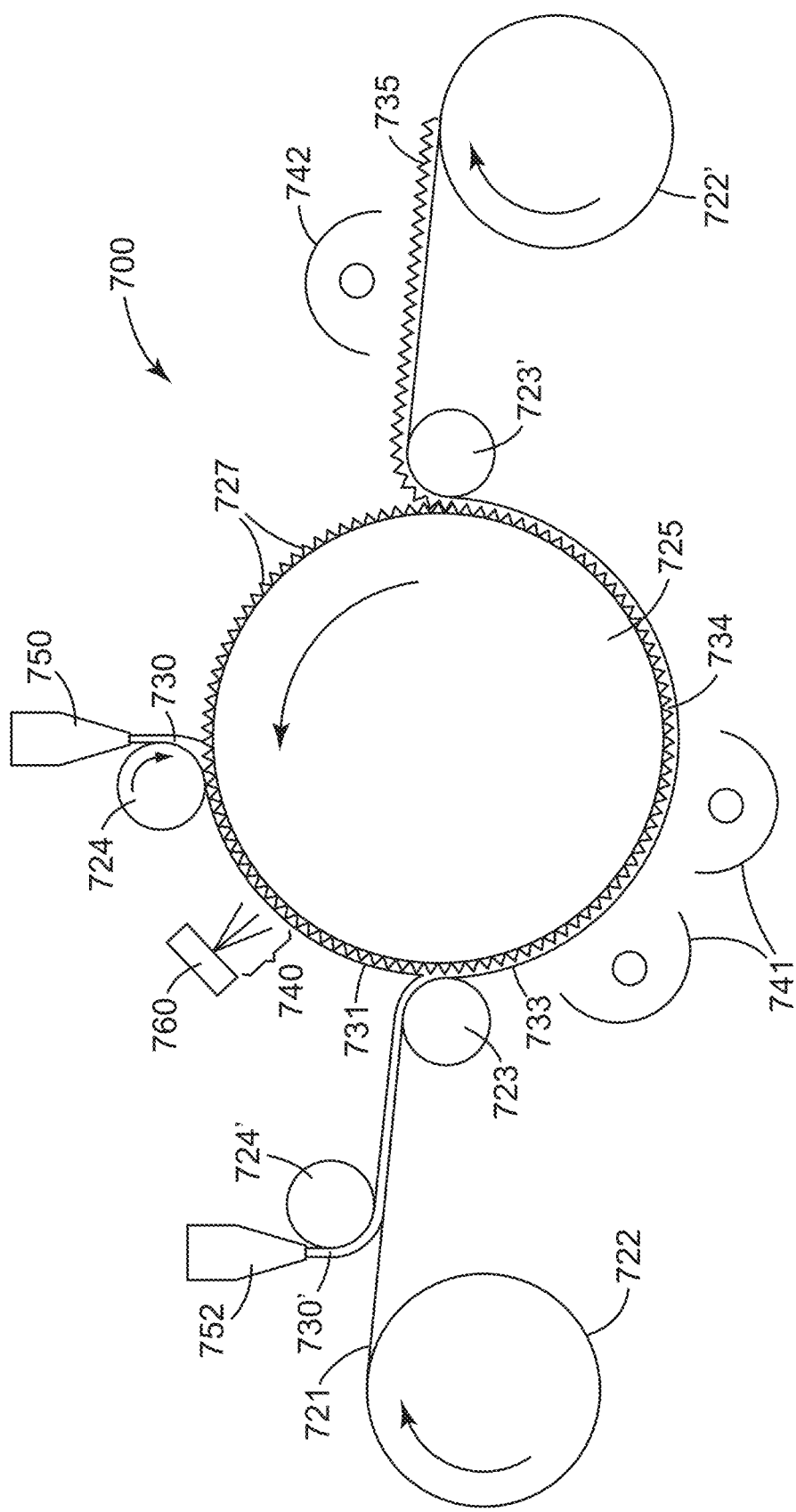
FIG. 7 is an illustration of an exemplary apparatus and an exemplary method for producing a retroreflective sheet of the present description.

FIG. 7 illustrates an embodiment of apparatus 700 that includes molding tool roll 725, having a microstructured surface having a plurality of cavities 727. Plurality of cavities 727 is at least partially filled with radiation curable resin 730, delivered from die 750 via roll 724. As molding tool roll 725 is rotated, radiation curable resin 730 passes under guided radiation source 760. Irradiated regions of radiation curable resin 730 are at least partially cured by first irradiation 740, while non-irradiated regions of radiation curable resin 730 are not cured, forming partially cured resin 731 comprising a pattern of irradiated regions and non-irradiated regions.

In the exemplary embodiment illustrated in FIG. 7, radiation curable resin 730' is coated onto a major surface of overlay film 721 (supplied from roll 722) which is then nipped against partially cured resin 731 on the microstructured surface of molding tool roll 725 (using roll 723), forming a partially cured composite 733 that is subsequently irradiated by second irradiation source 741 to form more fully cured composite 734. More fully cured composite 734 is separated from molding tool roll 725 at roll 723', and passes under third irradiation source 742 to retroreflective sheeting having structured layer of cube corner elements 735 and an optically variable mark in the structured layer of cube corner elements. For convenience, the retroreflective sheeting can be wound onto take-up roll 722'.

In some embodiments of the current disclosure, plurality of cavities 727 is partially filled with radiation curable resin 730 and passed under radiation source 760, followed by addition of radiation curable resin 730' and irradiation by second irradiation source 741, resulting in formation of composite cube corner elements. Examples of producing composite cube corner elements are described in U.S. Patent Application No. 61/491,554, entitled "RETROREFLECTIVE ARTICLES HAVING COMPOSITE CUBE-CORNERS AND METHODS OF MAKING", filed on the same date as the instant application, the disclosure of which is incorporated herein by reference.

In some embodiments of methods of the present disclosure, a patterned irradiation can be provided by any of irradiating through transparent regions of a mask, guiding a beam of light, guiding a beam of electrons, or projecting a digital image, examples of which are also described in U.S. Patent Application No. 61/491,616, entitled "METHODS FOR MAKING DIFFERENTIALLY PATTERN CURED MICROSTRUCTURED ARTICLES", filed on the same date as the instant application, the disclosure of which is incorporated herein by reference.

In some exemplary embodiments of the method illustrated in FIG. 7, radiation curable resins 730 and 730' may be the same as each other. In some other exemplary embodiments, radiation curable resins 730 and 730' may be different from each other.

Overlay film 721 is supplied from roll 722. Depending on the flexibility of overlay film 721, a carrier layer (not shown) may be provided as a backing for overlay film 721. The carrier layer may become incorporated into the retroreflective article, (e.g., the carrier layer may be firmly adhered to overlay film 721), or the carrier layer may be removably associated with overlay element 721 and removed after irradiation 742.

The finished retroreflective sheeting, viewed from the overlay film side, has high retroreflectivity. For example, the coefficient of retroreflection $R_A$ may be greater than 600 cd/lx/sqM at 0.2 degrees observation and 4 degrees entrance. $R_A$ cannot easily be measured on the narrow areas in embodiments where a directed laser beam used to form an optically variable mark (i.e., "laser marked areas"), but these areas are visually darker at small entrance angles, for example at 0.2 degree observation or less, and thus they have lower $R_A$ values. As the observation angle is increased, the laser marked areas increase in brightness until they are much brighter than the adjacent non-marked areas. Thus, the laser marked areas provide the optically variable effect of "switching" from dark to bright as a light source held near the eye and then moved to the side. Additional more complex optically variable effects can also be produced by controlling the energy density ("ED", Joules/cm$^2$) of laser energy applied to laser marked areas. We have found that when higher laser ED is used, then the resulting marks appear darker at small observation angles, "switch" to bright at a larger observation angle, and remain bright to a larger observation angle, relative to marks made at lower ED.

In some embodiments, the laser beam can be directed using a 2D scanner system controlled by a computer. Thus the process of forming an optically variable mark is highly flexible and is useful for features such as warranty marks and special customer logos. The marking process has the desirable attribute that no added materials are needed. Further, the marks are part of the structure of the cubes, and thus are difficult to copy or alter.

In some embodiments, the energy density of the patterned irradiation exposed to the radiation curable resin is continuously varied. Exemplary methods of continuously varying the energy density of a laser beam include use of a beam modulator, such as an acousto-optic modulator an electro-optic modulator, and a circularly variable neutral density filter. Other embodiments would be apparent to one of ordinary skill in the art.

In some embodiments, optically variable marks of the present disclosure are useful as security markings. The optically variable marks can include security markings formed by asymmetrical reflectance properties of prismatic films to create visible features that vary with viewing angle. The security mark and the surrounding area of the retroreflective film have light reflectance patterns that do not "match up". Thus the security mark and the surrounding area have different retroreflectivity and different visual appearance at some viewing angles. Preferred security features are difficult to copy by hand and/or by machine or are manufactured using secure and/or difficult to obtain materials.

Suitable radiation curable resins for forming retroreflective sheeting of the present description include cross linked acrylates such as multifunctional acrylates or epoxies and acrylated urethanes blended with mono- and multifunctional monomers. Further, a structured layer of cube corner elements may be cast onto plasticized polyvinyl chloride film for more flexible retroreflective sheeting. These polymers may be preferred, for example, because of thermal stability, environmental stability, clarity, excellent release from the tooling or mold, and capability of receiving a reflective coating. Retroreflective sheeting may be prepared by casting a structured layer of cube corner elements directly onto a film (see, e.g., U.S. Pat. No. 5,691,846 (Benson), the description of which is incorporated herein by reference).

The cube corner elements can be formed on a polycarbonate film about 0.5 mm thick having an index of refraction of about 1.59. Useful materials for making retroreflective sheeting are preferably materials that are dimensionally stable, durable, weatherable, and readily formable into the desired configuration. Generally any optically transmissive material that is formable, typically under heat and pressure, can be used. The sheeting can also include colorants, dyes, UV absorbers or separate UV absorbing layers, and other additives as needed. A backing layer sealing the cube corner elements from contaminants can also be used, together with an adhesive layer. Alternatively, a specularly reflecting coating (e.g., a metallic coating) may be used.

The optically variable mark can be any useful mark including a shape, a figure, a symbol, a design, a letter, a number, alphanumeric character, and indicia, for example. The optically variable mark may comprise discrete elements forming a pattern or may be continuous.

EMBODIMENTS

Item 1. A method of forming retroreflective sheeting, comprising:

providing a mold having a structured surface including a plurality of cube corner cavities therein;

at least partially filling the plurality of cube corner cavities with a radiation curable resin;

exposing the radiation curable resin to a first, patterned irradiation to provide a first energy density level of irradiation to the radiation curable resin in a first area of the plurality of cube corner cavities, to form a first optically variable mark element;

exposing the radiation curable resin to a second, patterned irradiation to provide a second energy density level of irradiation different from the first energy density level of irradiation to the radiation curable resin in a second area of the plurality of cube corner cavities, to form a second optically variable mark element;

exposing the radiation curable resin to a third irradiation to provide a third energy density level of irradiation to at least the radiation curable resin in an area of the plurality of cube corner cavities contiguous with the first and second areas thereof, wherein the third energy density level is different from the first and second energy density levels, to provide retroreflective sheeting having a structured layer of cube corner elements and an optically variable mark therein comprising the first and second mark elements; and separating the retroreflective sheeting from the mold.

Item 2. The method of item 1, wherein each of the first, patterned irradiation and the second, patterned irradiation independently comprises at least one of irradiating through transparent regions of a mask, guiding a beam of light, guiding a beam of electrons, or projecting a digital image.

Item 3. The method of item 1, wherein the radiation curable resin is a first radiation curable resin, and the method further comprises applying a second radiation curable resin over the first and second optically variable mark elements prior to the third irradiation.

Item 4. The method of any preceding item, further comprising applying an overlay film over the radiation curable resin.

Item 5. The method of any preceding item, wherein the mold is transparent to at least one of the first, patterned irradiation, the second, patterned irradiation, or the third irradiation.

Item 6. The method of any preceding item, wherein the first energy density level and the second energy density level have an absolute difference of at least 0.1 Joule/cm$^2$.

Item 7. A method of forming retroreflective sheeting, comprising:

providing a mold having a structured surface including a plurality of cube corner cavities therein;

at least partially filling the plurality of cube corner cavities with a radiation curable resin;

exposing a first portion of the radiation curable resin along a predetermined path to a first, continuously varied level of irradiation to provide an optically variable mark element; and exposing at least a second portion of the radiation curable resin in a plurality of cube corner cavities contiguous with the mark element path to a second irradiation, to provide retroreflective sheeting having a structured layer of cube corner elements and an optically variable mark element therein; and separating the retroreflective sheeting from the mold.

Item 8. The method of item 7, wherein the patterned irradiations independently comprises at least one of irradiating through transparent regions of a mask, guiding a beam of light, guiding a beam of electrons, or projecting a digital image.

Item 9. The method of item 7, wherein the radiation curable resin is a first radiation curable resin, and the method further comprises applying a second radiation curable resin over the optically variable mark element prior to the second irradiation.

Item 10. The method of any one of items 7 to 9, further comprising applying an overlay film over the radiation curable resin.

Item 11. The method of any one of items 7 to 10, wherein the mold is transparent to at least one of the first, patterned irradiation, or the second irradiation.

Item 12. The method of any one of items 7 to 11, wherein the continuously varied energy density level has a highest energy density value and a lowest energy density value, wherein the difference between the highest energy density value and the lowest energy density value is at least 0.1 Joule/cm$^2$.

Item 13. Retroreflective sheeting, comprising:

a structured layer comprising cube corner elements; and at least one optically variable mark in the structured layer of cube corner elements;

wherein the at least one optically variable mark comprises at least first and second mark elements, the first optically variable mark element having a first visual feature, the second optically variable mark element having a second visual feature different from the first visual feature.

Item 14. The retroreflective article of item 13, wherein the structured layer of cube corner elements is disposed on a land layer in a range from greater than 0 micrometer up to 150 micrometers.

Item 15. The retroreflective sheeting of item 13, wherein the first visual feature and the second visual feature are independently selected from: retroreflectance at a given orientation, entrance or observation angle; brightness at a given orientation, entrance or observation angle; whiteness at a given orientation, entrance or observation angle; and rotational symmetry.

Item 16. A security article comprising the retroreflective sheeting of item 13.

Item 17. The security article of item 16, wherein the optically variable mark is selected from the group consisting of a shape, figure, symbol, design, letter, number, alphanumeric character, indicia, and combinations thereof.

Item 18. The retroreflective sheeting of item 16, wherein the layer of cube corner prisms further comprises a background visual appearance visually distinguishable from the optically variable mark.

Item 19. Retroreflective sheeting, comprising:

a structured layer of cube corner elements; and at least one optically variable mark in the structured layer of cube corner elements;

wherein the at least one optically variable mark comprises at least one visual feature and wherein the at least one visual feature includes a visually distinguishable continuous variation within at least a portion of the optically variable mark.

Item 20. The retroreflective sheeting of item 19, wherein the structured layer of cube corner elements is disposed on a land layer having a thickness greater than 0 micrometer and up to 150 micrometers.

Item 21. The retroreflective sheeting of item 19, wherein the at least one visual feature is selected from: retroreflectance at a given orientation, entrance or observation angle; brightness at a given orientation, entrance or observation angle; whiteness at a given orientation, entrance or observation angle; and rotational symmetry.

Item 22. The retroreflective sheeting of item 19, wherein the at least one optically variable mark is selected from the group consisting of a shape, figure, symbol, design, letter, number, alphanumeric character, indicia, and combinations thereof.

Item 23. The retroreflective sheeting of item 19, wherein the layer of cube corner prisms further comprises a background visual appearance visually distinguishable from the optically variable mark.

Item 24. Retroreflective sheeting made according to the method of any one of items 1 to 12.

Item 25. A vehicle license plate comprising the retroreflective sheeting of any one of items 13 to 24.

Item 26. A sign comprising the retroreflective sheeting of any one of items 13 to 24.

EXAMPLES

Test Methods

Measuring Observation Angle at which the Optically Variable Mark Becomes Bright or not Visible Samples of retroreflective sheeting comprising optically variable marks prepared as described in Examples 1-5 were viewed, in a darkened room, using a flashlight (obtained from MAG Instrument, Ontario, Calif., under the trade designation "MINI MAGLITE"). The prismatic surface of the retroreflective sheeting was viewed along an axis approximately normal to the prismatic surface, and from a distance of about 3 meters. The flashlight was aligned with and close to a viewer's eye (observation angle of about 0°) and subsequently moved to the side, thereby increasing the observation angle. When the optically variable mark appeared fully bright, the distance from the viewer's eye to flashlight was measured and observation angle calculated. The flashlight was then moved further from the viewer's eye until the optically variable mark was no longer visible. The distance from the viewer's eye to the flashlight was recorded, and the observation angle was calculated.

The calculation of observation angle was according to the following equation:

observation angle=arctan [(distance from eye to flashlight)/(distance from eye to sheeting)]

Materials

| | |
|---|---|
| BAED | bisphenol-A epoxy diacrylate obtained from Cytec Industries Inc., Smyrna, GA, under the trade designation "EBECRYL 3720". |
| DMAEA | Dimethylaminoethyl acrylate, obtained from Cytec Industries Inc. |
| TMPTA | Trimethylolpropane triacrylate, obtained from Cytec Industries Inc. |
| HDDA | 1,6-hexanediol diacrylate, obtained from Cytec Industries Inc. |
| TPO | (2,4,6 trimethylbenzoyl) diphenylphosphine oxide, a photoinitiator, obtained from Sigma-Aldrich, St. Louis, MO. |
| EAA | Ethylene acid acrylate, obtained from Dow Company, Midland, MI, under the trade designation "PRIMACOR 3440". |

Preparation of Composition 1

A first radiation-curable resin (Composition 1) was prepared by combining 25 wt. % BAED, 12 wt. % DMAEA, 38 wt. % TMPTA, 25 wt. % HDDA, and 0.5 pph (parts per hundred) TPO.

Illustrative Examples 1-3

An overlay film was made by extruding an EAA film at a thickness of 0.06 mm (2.5 mil) onto a 0.05 mm (2 mil) corona treated polyethylene terephthalate (PET) carrier film according to the following description: pellets of EAA were fed into a 1.9 cm (0.75 in.) single screw extruder (obtained from C. W. Brabender Instruments Inc., South Hackensack, N.J.) with temperatures set at 140° C. (284° F.) for zone 1 and ramped up to 175° C. (347° F.) at the extruder exit and die, resulting in a melt temperature of about 175° C. (347° F.). As the molten resin exited the extruder, it passed through a conventional horizontal film die (obtained from Extrusion Dies Industries LLC, Chippewa Falls, Wis., under the trade designation "ULTRAFLEX-40") and was cast onto the PET carrier film. The PET carrier film was traveling at about 36 meters/min (120 ft/min). The resulting molten overlay film on the PET carrier film was run between a rubber roll/chilled steel roll nip to solidify the molten resin into a layer. The EAA surface was corona treated at an energy level of about 1.0 J/cm².

The following description for the preparation of Examples 1-3 refers to apparatus 700 as generally shown in FIG. 7. A retroreflective sheeting was prepared by coating a first portion of Composition 1 onto mold 725 using conventional coating die 750 as generally shown in FIG. 7. Die 750 was positioned to provide Composition 1 between mold 725 and rubber coated nip roll 724. Mold 725 had a structured surface including plurality of cube-corner cavities 727. Mold 725 was heated to about 180° F. (82° C.) and rotated at a speed of about 50 fpm (15.2 m/min). Composition 1 (730) partially filled the cube-corner cavities to about 60% in volume, providing partially filled partial cube-corner structures 731. An optically variable mark was formed by irradiating a portion of partially filled partial cube-corner structures 731 while in contact with mold 725. The irradiated portion of the partially filled partial cube-corner structures were crosslinked with Nd:YVO₄ UV laser 760 (obtained from Coherent Inc., Santa Clara, Calif., under the trade designation "AVIA 355-28") having a wavelength of 355 nm and a spot size of 3.5 mm, with a mirror positioned at a distance of about 600 millimeters from the tool surface. The mirror was oscillated to move the laser beam across the surface (scanning speed) at a rate of 600 millimeters per second in a generally sinusoidal pattern. The average laser power (in Watts (W)) and energy density varied in each of Examples 1-3, as shown in Table 1, below.

TABLE 1

| Examples | Average laser power (W) | Energy density (J/cm²) |
|---|---|---|
| Example 1 | 8.5 | 0.26 |
| Example 2 | 15 | 0.72 |
| Example 3 | 30.4 | 1.45 |

A second portion of Composition 1 (730') was simultaneously cast onto the EAA side of overlay film 721, supplied from roll 722. The coated overlay film was then nipped (using roll 723) against the mold 725 containing the partially filled partial cube-corner structures 731, at least some of which had been previously crosslinked. The resin coated on the overlay film completely filled the unfilled portion of the cube-corner cavities, and the composite construction 733 was cured through the overlay film 721 to form a retroreflective sheeting 734, using two UV lamps 741 (obtained from Fusion Systems, Rockville, Md., under the trade designation "FUSION D") set at 600 W/in., and also using dichroic filters (not shown) in front of the UV lamps. The retroreflective sheeting 734 was separated from the mold 725 at roll 723' and subsequently irradiated by UV lamp 742 ("FUSION D") operating at 100% to provide a UV irradiation post-cure through the composite cube-corner structures 735. The retroreflective film 734 was then passed through an oven (not shown) set at about 130° C. (265° F.), and wound onto roll 722'.

The resulting cube-corner structures 735 had three sets of intersecting grooves with a pitch of 3.2 mils (81 micrometers). The intersecting grooves formed a cube-corner base triangle with included angles of 61° and a cube-corner element height of 1.95 mil (50 micrometers). The primary groove spacing is defined as the groove spacing between the grooves which form the two 61° base angles of the base triangle.

The retroreflective sheetings prepared as described above comprised optically variable marks created at different energy densities. The observation angles at which the optically variable marks appeared bright or not visible were measured as described above. Results are reported in Table 2, below.

TABLE 2

| | Observation angle (°) | |
|---|---|---|
| Examples | Mark bright | Mark not visible |
| Example 1 | 1.2 | 2.6 |
| Example 2 | 2.9 | 9 |
| Example 3 | 4.8 | >16 |

Example 4

Figure 6:
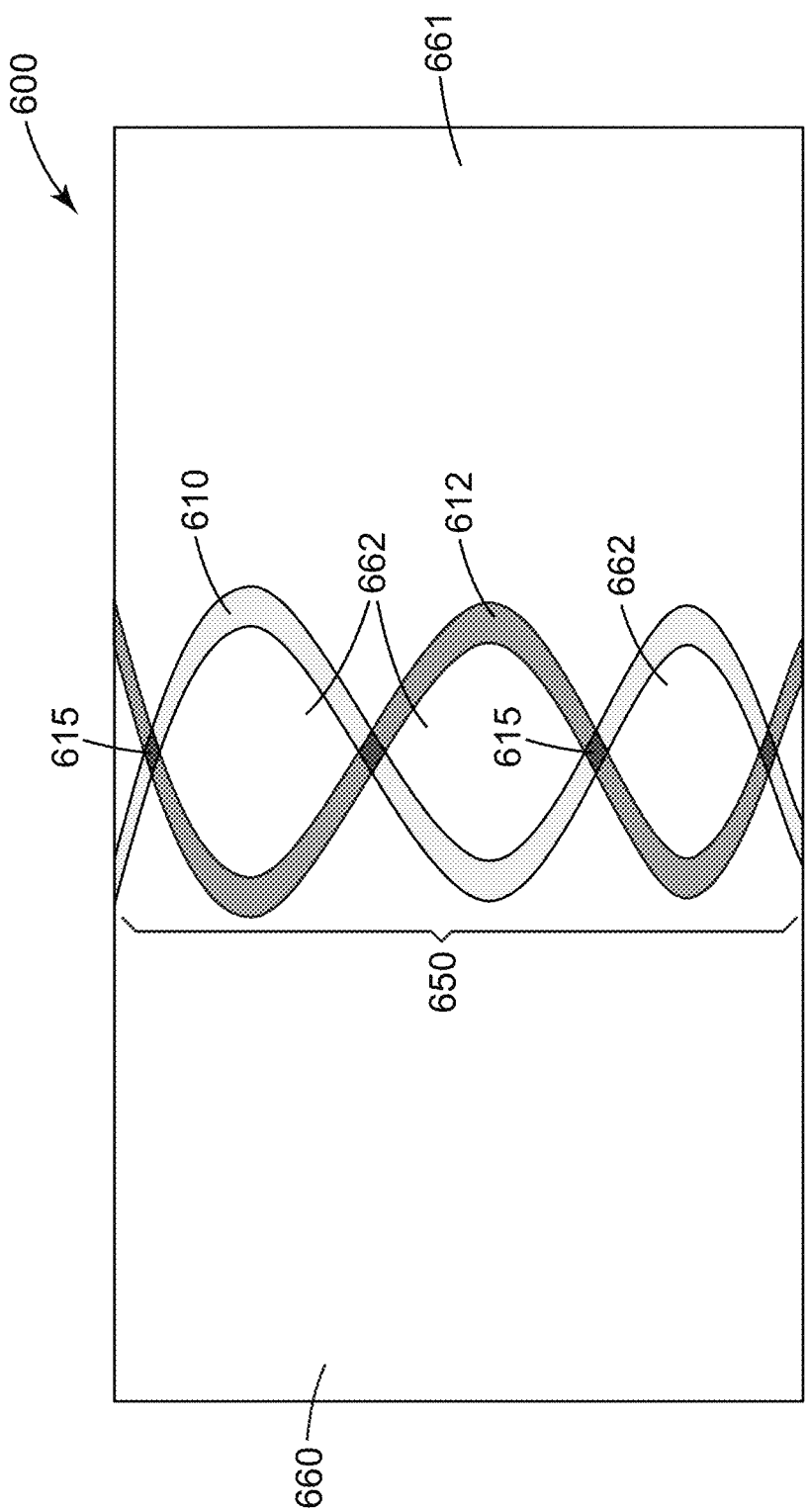
FIG. 6 is an illustration of an exemplary embodiment of retroreflective sheeting of the present description.

A retroreflective sheeting comprising an optically variable mark was produced as generally described in Examples 1-3, except that a different laser was used (obtained from Coherent Inc. under the trade designation "AVIA 355-7"). A two-dimensional (2D) scanner for 355 nm wavelength (obtained from Cambridge Technology Inc., Lexington, Mass., under the trade designation "PROSERIES SCAN HEAD") and associated software were used to control the shapes made with the laser beam, and also the velocity of the laser on the resin and/or on the mold. A zoom beam expander (obtained from Edmund Optics Inc., Barrington, N.J., under the trade designation "MODEL NT64-420") was installed to reduce the laser raw beam diameter from about 3.5 mm to about 1.0 mm to control the energy density. The average laser power was 7 W. The optically variable mark generally comprised a first 612 and a second 610 intertwined sinusoidal waves as illustrated in FIG. 6. The first sinusoidal wave 612 was formed at a beam velocity of 400 mm/s and an energy density of 1.75 J/cm$^2$. The second sinusoidal wave 610 was formed at a beam velocity of 800 mm/s and an energy density of 0.88 J/cm$^2$.

The retroreflective sheeting prepared as described above included an optically variable mark comprising first 612 and second 610 intertwined sinusoidal waves created at different energy densities. The retroreflective sheeting was viewed at a specific observation angle (calculated as described above) and whether the first and/or second sinusoidal waves appeared bright or not visible was noted. Results are reported in Table 3, below.

TABLE 3

| | Observation angle (°) | | |
|---|---|---|---|
| | 1 | 3 | 5 |
| First sinusoidal wave | Bright | Bright | Not visible |
| Second sinusoidal wave | Bright | Not visible | Not visible |

Example 5

A retroreflective sheeting comprising an optically variable mark was produced as generally described in Example 4, except the average laser power was about 6 W, the pulse rate was about 70 kHz and the beam size was about 1.75 mm in diameter. An optically variable mark 450 comprising thirteen discrete segments was produced by controlling the energy density applied to each segment as shown in Table 4, below. The energy density was varied by varying scanning speed.

TABLE 4

| Segments | Scanning speed (mm/s) | Energy density (J/cm$^2$) |
|---|---|---|
| Segment 1 | 300 | 1.3 |
| Segment 2 | 350 | 1.1 |
| Segment 3 | 400 | 1.0 |
| Segment 4 | 450 | 0.89 |
| Segment 5 | 500 | 0.80 |
| Segment 6 | 550 | 0.73 |
| Segment 7 | 600 | 0.67 |
| Segment 8 | 650 | 0.62 |
| Segment 9 | 700 | 0.57 |
| Segment 10 | 750 | 0.53 |
| Segment 11 | 800 | 0.50 |
| Segment 12 | 850 | 0.47 |
| Segment 13 | 900 | 0.44 |

Example 6 (Prophetic Example)

A retroreflective sheeting could be prepared as generally described in Examples 1-3, except that a continuously variable beamsplitter could be placed between the linearly polarized laser source and the 2D scanner, to modulate the energy density of the laser beam on the partially filled partial cube-corner structures 731. The continuously variable beamsplitter could comprise a half-wave waveplate and a polarizing beamsplitter cube. An optically variable mark could be created by rotating the optical axis of the half-wave waveplate about the propagation direction of the laser beam to continuously vary the amount of energy transmitted through the continuously variable beamsplitter while simultaneously oscillating the mirror in a generally sinusoidal pattern.

Example 7 (Prophetic Example)

A retroreflective sheeting could be prepared as described in Example 6, except that the optically variable mark could comprise first and second intertwined generally sinusoidal waves and both the transmitted and the reflected beam that emerge from the continuously variable beamsplitter could be used. Turning mirrors could be used to direct both beams to the same area. The first and second sinusoidal waves could be created by continuously varying the energy density of the transmitted and reflected beams in an opposite and complementary fashion, such that the appearance of the two marks could vary in opposite ways.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. Retroreflective sheeting, comprising:
a structured layer comprising cube corner elements; and
at least one optically variable mark in the structured layer of cube corner elements;
wherein the at least one optically variable mark comprises at least three mark elements: a first mark element, a second mark element, and a third mark element,
wherein the first mark element comprises a plurality of the cube corner elements and has a first visual feature,
wherein the second mark element comprises a plurality of the cube corner elements and has a second visual feature different from the first visual feature,
wherein the third mark element comprises a plurality of the cube corner elements and has a third visual feature,
wherein each of the first visual feature, the second visual feature, and the third visual feature is retroreflectance at a given observation angle, and
wherein the observation angle required to achieve peak retroreflectance increases sequentially from the first mark element to the third mark element.

2. The retroreflective sheeting of claim 1, wherein the second visual feature comprises a second continuously varied visual feature formed by varying an energy density from an irradiation source applied along a length of the second continuously varied visual feature while curing the cube corner elements that form the at least one optically variable mark.

3. The retroreflective sheeting of claim 1, wherein the structured layer of cube corner elements is disposed on a land layer in a range from greater than 0 micrometer up to 150 micrometers.

4. The retroreflective sheeting of claim 1, wherein the first continuously varied visual feature and the second visual feature are independently selected from: retroreflectance at a given orientation, entrance, or observation angle; brightness at a given orientation, entrance, or observation angle; whiteness at a given orientation, entrance, or observation angle; and rotational symmetry.

5. The retroreflective sheeting of claim 1, wherein the structured layer of the cube corner elements further comprises a background visual appearance visually distinguishable from the at least one optically variable mark.

6. A security article comprising the retroreflective sheeting of claim 1.

7. A license plate comprising the retroreflective sheeting of claim 1.

8. A traffic sign comprising the retroreflective sheeting of claim 1.

9. The retroreflective sheeting of claim 1, wherein the first continuously varied visual feature is selected from the group consisting of a shape, figure, symbol, design, letter, number, alphanumeric character, indicia, and combinations thereof.

10. The retroreflective sheeting of claim 1, wherein the cube corner elements are selected from the group consisting of truncated cube corners or full cube corners.

11. The retroreflective sheeting of claim 1, wherein the at least one optically variable mark is not visible at an observation angle of more than ten degrees.

12. The retroreflective sheeting of claim 1, wherein the first mark element has a first light divergence profile and the second mark element has a second light divergence profile, visually different from the first light divergence profile.

13. The retroreflective sheeting of claim 1, wherein the first mark element includes a first set of cube corner elements and the second mark element includes a second set of cube corner elements, and wherein the first set of cube corner elements and second set of cube corner elements differ in at least one of cube size, degree of cant, and cube geometry.

* * * * *